US007599548B2

(12) United States Patent
Nishiyama

(10) Patent No.: US 7,599,548 B2
(45) Date of Patent: Oct. 6, 2009

(54) IMAGE PROCESSING APPARATUS AND IMAGE PROCESSING METHOD

(75) Inventor: Manabu Nishiyama, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 783 days.

(21) Appl. No.: 11/387,901

(22) Filed: Mar. 24, 2006

(65) Prior Publication Data

US 2006/0222238 A1 Oct. 5, 2006

(30) Foreign Application Priority Data

Mar. 31, 2005 (JP) ............................. 2005-104959

(51) Int. Cl.
*G06K 9/00* (2006.01)

(52) U.S. Cl. ..................................... 382/154

(58) Field of Classification Search ................ 382/103, 382/107, 151, 154, 218, 236, 291; 345/419–420; 348/51
See application file for complete search history.

(56) References Cited

U.S. PATENT DOCUMENTS 6,462,769 B1 * 10/2002 Trowbridge et al. ........... 348/51

6,999,513 B2 * 2/2006 Sohn et al. ............. 375/240.16

FOREIGN PATENT DOCUMENTS

JP 2002-159024 5/2002

OTHER PUBLICATIONS

Shoichi Shimizu, et al., "Fast 3D Position Measurement Using Cameras Shutter Timing Adjusted", Meeting on Image Recognition and Understanding, (MIRU 2004), vol. 1, Jul. 2004, pp. 428-433.

* cited by examiner

*Primary Examiner*—Daniel G Mariam
(74) *Attorney, Agent, or Firm*—Oblon, Spivak, McClelland, Maier & Neustadt, L.L.P.

(57) ABSTRACT

A first image obtained by taking a moving object at a frame time point t by a first imaging device, a second image obtained by taking the moving object at a frame time point t+Δt by a second imaging device having a view point different from that of the first imaging device, and a third image obtained by taking the moving object at a frame time point t−Δt by the second imaging device are acquired. A first corresponding point on the first image corresponding to an arbitrary point on the second image is searched for, and the disparity of the arbitrary point is measured. Motion information of the arbitrary point is calculated on the basis of the third image, and by use of the motion information as a correction amount, the disparity is corrected. Three-dimensional position information of the arbitrary point is calculated on the basis of the corrected disparity.

12 Claims, 6 Drawing Sheets

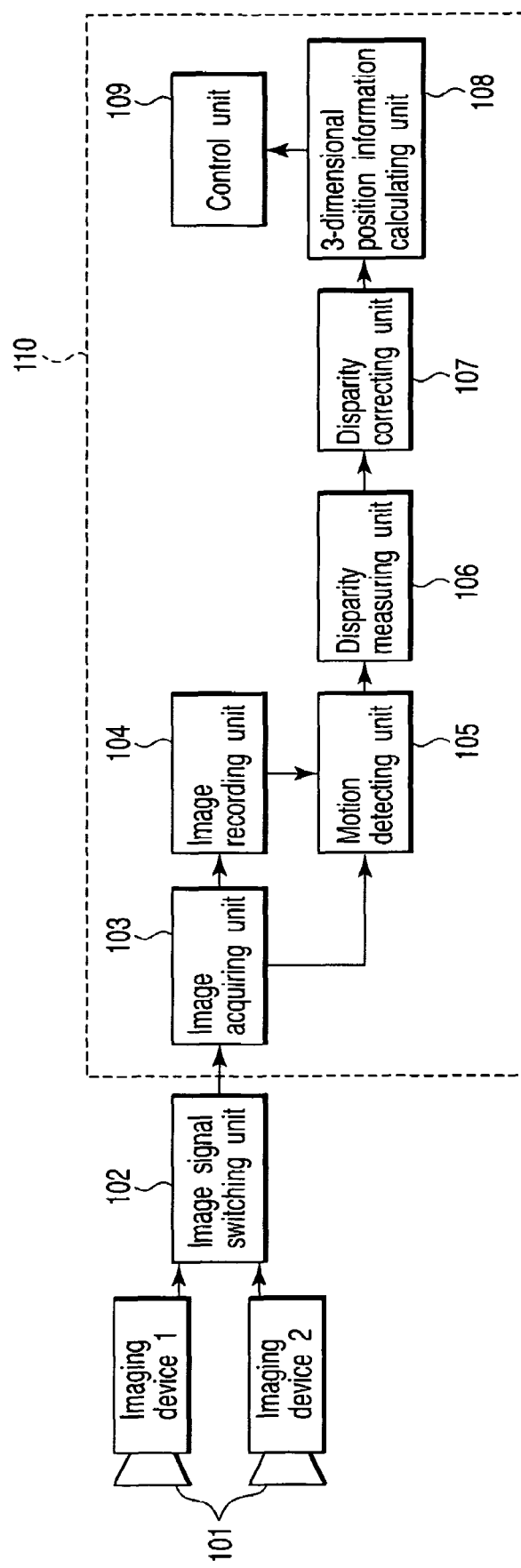
F I G. 1

IMAGE PROCESSING APPARATUS AND IMAGE PROCESSING METHOD

CROSS-REFERENCE TO RELATED APPLICATIONS

This application is based upon and claims the benefit of priority from prior Japanese Patent Application No. 2005-104959, filed Mar. 31, 2005, the entire contents of which are incorporated herein by reference.

BACKGROUND OF THE INVENTION

1. Field of the Invention

The present invention relates to an image processing apparatus and an image processing method for calculating three-dimensional position information of an object by processing images taken at different frame time points by use of a plurality of cameras.

2. Description of the Related Art

Various research and development actions are now made concerning a visual perception processing system of a moving robot that follows a person. When the moving robot moves so as to follow a moving object such as a person, its visual perception processing system first takes images of the moving object and measures its three-dimensional positions by processing the images. According to the result of the measurement, the robot calculates the control amount of its driving system for movement.

Conventionally, there are known a person detection technology by background differences used in a monitoring system, and a technology for recognizing the head of a person by image processing, and these technologies may be applied to a visual perception processing system of a moving robot. However, because background images change greatly as the robot moves, the background difference method is not suitable for the visual perception processing system of the moving robot. Further, owing to positional relation with a person or a blockage etc., the head of an object to follow is not always taken in the visual range of the robot, and therefore, the person head recognition technology is also not effective. When it is taken into consideration that the moving robot makes its actions in the living space of the person, it is required for the robot to reduce data of a processing object and perform a high speed process.

Herein, there is known a technology for processing images taken at different frame time points (shutter timing) by use of a plurality of cameras, thereby calculating three-dimensional position information of an object at a high speed (for example, "High Speed three-dimensional Position Estimation using Differences in Shutter Timing between Cameras", Shoichi Shimizu, Hironori Fujiyoshi, Proc. of MIRU2004, vol. 1, pp. 428-433, July, 2004).

In mounting the visual perception processing system to the moving robot, it is necessary to suppress a burden to a computer processing capacity provided in the robot as low as possible. The moving robot consumes its computer resources for not only its visual process but also moving mechanism control and other processes. Although processor performances are progressing, enhancing the computer processing capacity to a great extent leads to increased product costs. From these circumstances, there is a case where, in the visual perception processing system, a configuration is employed where image signals are taken in alternately from a plurality of cameras.

When a stereo image process is performed simply with a pair of images taken at different frame time points by use of plural cameras in order to calculate three-dimensional position information of an object, errors arising from differences of the frame time points occur, which has been a problem in the prior art.

BRIEF SUMMARY OF THE INVENTION

An image processing apparatus according to an aspect of the present invention comprises: an image acquiring device configured to acquire a first image obtained by taking a moving object at a frame time point t by a first imaging device, a second image obtained by taking the moving object at a frame time point t+αt by a second imaging device having a view point different from that of the first imaging device, and a third image obtained by taking the moving object at a frame time point t−Δt by the second imaging device; a disparity measuring device configured to search for a first corresponding point on the first image corresponding to an arbitrary point on the second image, and to measure the disparity of the arbitrary point; a motion information calculating device configured to calculate motion information of the arbitrary point on the basis of the third image; a disparity correcting device configured to correct the disparity by use of the motion information as a correction amount; and a three-dimensional position information calculating device configured to calculate three-dimensional position information of the arbitrary point on the basis of the corrected disparity.

BRIEF DESCRIPTION OF THE SEVERAL VIEWS OF THE DRAWING

FIG. 1 is block diagram showing an image processing apparatus according to a first embodiment of the present invention;

DETAILED DESCRIPTION OF THE INVENTION

Embodiments according to the present invention will be illustrated in more details with reference to the accompanying drawings hereinafter.

First Embodiment

Figure 2:
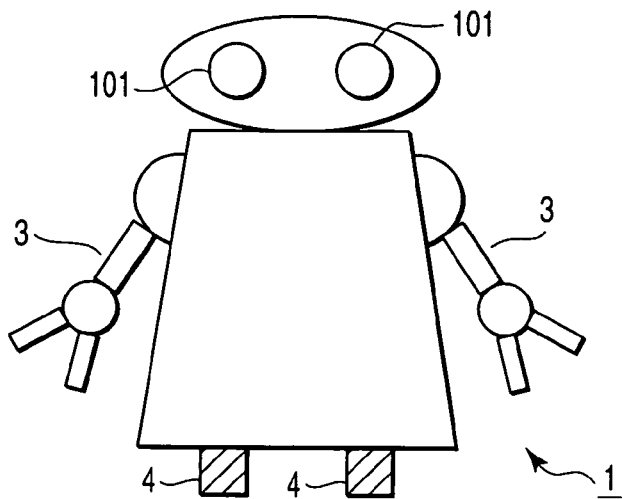
FIG. 2 is a view showing an external appearance of a robot according to the embodiment.

FIG. 1 is block diagram showing an image processing apparatus (visual perception processing system) according to a first embodiment of the present invention. In the embodiment, the present invention is applied to a robot 1 as shown in FIG. 2. The robot 1 includes a plurality of imaging devices 101, arms 3, wheels 4, and these are controlled by a control unit (not shown). When the robot 1 of the above configuration performs tasks such as grasping something with the arms 3, and continuing running after a specific person, the robot 1 needs to acquire three-dimensional position information of these objects. In the present embodiment, creation of the three-dimensional position information is realized by a relatively simple apparatus configuration and image processing.

For the embodiment of the invention, a plurality of imaging devices 101 are required. In the configuration shown in FIGS. 1 and 2, two imaging devices 101 are employed. Meanwhile, the positional relation of the two imaging devices is assumed to be already known.

An image signal switching unit 102 switches image signals output from the two imaging devices 101 alternately and supplied the signals to an image acquiring unit 103. The image acquiring unit 103 inputs the image signals from the image signal switching unit 102, and converts the image signals into digital image data that can be easily processed by a computer. Thereby, plural images of an object with different frame time points are taken into the image processing apparatus of the present embodiment.

An image recording unit 104 records the image data acquired via the image acquiring unit 103 temporarily. The image recording unit 104 performs a recording and retaining operation such that at least one frame previous image data taken by the imaging devices 101 can be referred to.

A motion detecting unit 105 detects motions on the image data and creates motion information. The motion detecting unit 105 compares image data of the latest frame time point, and one frame previous image data recorded in the image recording unit 104, and measures how much an identical point has moved between two images, thereby obtaining motion information.

A disparity measuring unit 106 measures a disparity between images taken by the two imaging devices 101. A disparity correcting unit 107 corrects the disparity obtained by the disparity measuring unit 106 by use of the motion information obtained by the motion detecting unit 105. A three-dimensional position information calculating unit 108 calculates three-dimensional position information of an object from the corrected disparity. A control unit 109 obtains a control amount of the robot from the three-dimensional position information obtained by the three-dimensional position information calculating unit 108. In FIG. 1, the structural elements excluding the two imaging devices 101 and the image signal switching unit 102 are realized as a computer 110 as shown in the figure.

In the embodiment configured as described above, an object is photographed, and the three-dimensional position information thereof is calculated.

Figure 3:
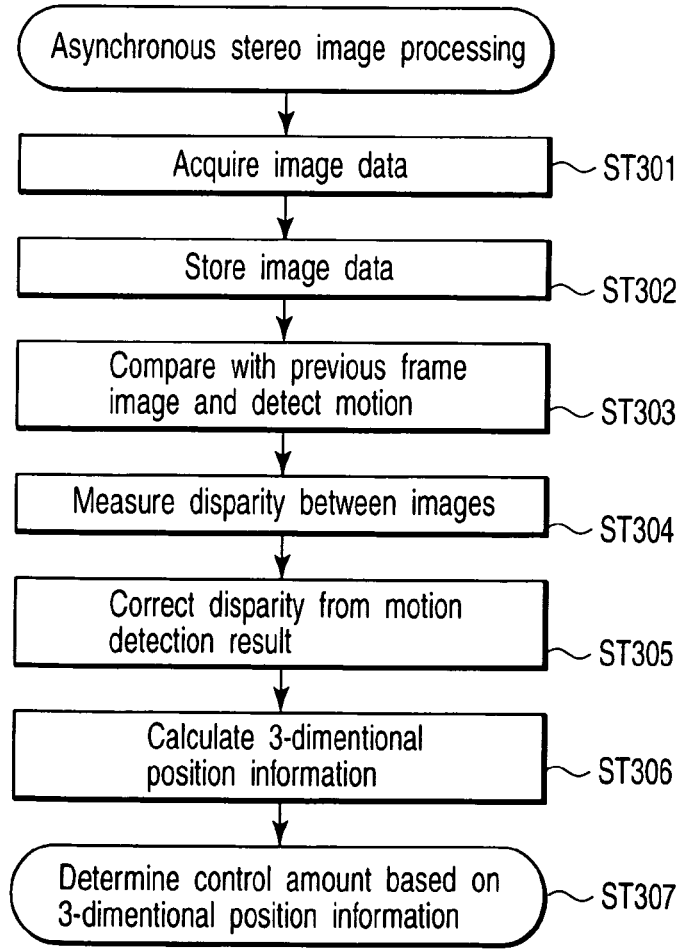
FIG. 3 is a flow chart showing an asynchronous stereo image processing procedure according to the first embodiment of the invention.

FIG. 3 is a flow chart showing an asynchronous stereo image processing procedure according to the first embodiment of the invention.

First, in ST301, image data is acquired from the imaging device 101 via the image signal switching unit 102. In general, the size of time series image data becomes enormous. In particular, for taking in image data at bulk from a plurality of imaging devices 101, and transferring the data to a memory device (not shown) in the computer 110, a communication path whose transmission speed is sufficiently high is required. Therefore, in the present embodiment, image data is taken in by the image signal switching unit 102 while switching data alternately for each of the imaging devices. Switching image signals requires a specific time, and as a result, "differences" occur in shutter time points (frame time points) of two items of image data obtained from two imaging devices 101. Meanwhile, in the following explanation, it is assumed that the time required for switching signals is always constant.

Figure 4:
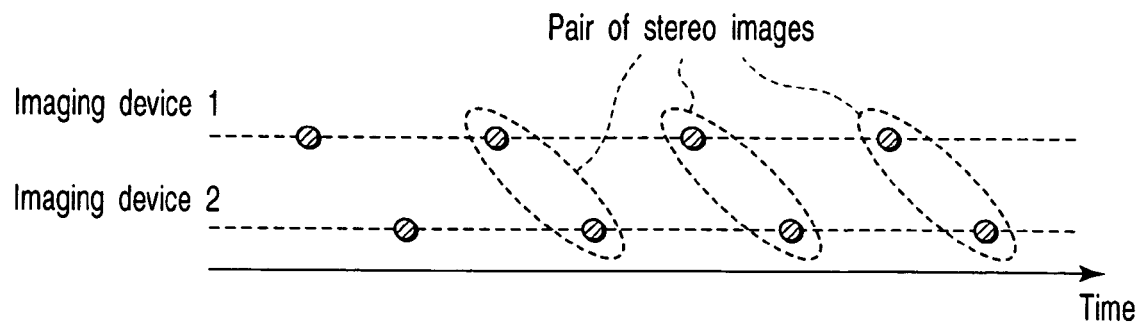
FIG. 4 is a view showing the shutter timing (time points) by two imaging devices.

FIG. 4 is a view showing the shutter timing (time points) of the imaging devices 1 and 2. As shown in FIG. 4, a stereo image process is performed with two images having differences in time as a pair of stereo images. However, in a general stereo image process, it is a precondition that image data obtained at an identical time point by plural imaging devices are employed. If there is a difference in shutter time points, errors occur, and a correct stereo image process result cannot be obtained.

The embodiment of the invention is to reduce the errors, and to enable to perform a stereo image process appropriately even in the case of using a pair of images having differences in time.

In ST302, the obtained image data is temporarily stored in the image recording unit 104. Herein, at least image data previous one frame to the latest image is stored. Previous Image data are deleted sequentially.

In ST303, with regard to any one of the two imaging devices 101, the latest image data and one frame previous image data by the same imaging device recorded by the image recording unit 104 are compared, and motion information in the images is measured. More specifically, these processes are performed as described below.

Figure 5:
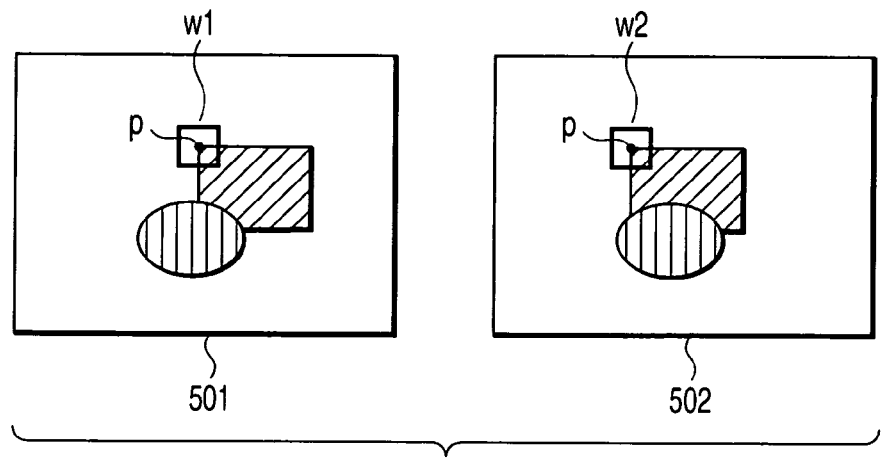
FIG. 5 is a view showing the latest image data, and one frame previous image data obtained by a same imaging device.

FIG. 5 shows the latest image data 501, and one frame previous image data 502 obtained by a same imaging device. Now, when obtaining motions of a point p in the image data 501, a small area w1 with the point p at the center thereof is created. Then, block matching with the one previous image data 502 is performed, and a small area whose similarity is highest is searched for. The search range is a specific range from the coordinates of the point p, and the sum of squared errors of pixel values in a block are used as the similarity. In the case of FIG. 5, the area that is most similar to the small area w1 is a small area w2. When it is considered that the small area w1 and the small area w2 are images of an identical portion, the coordinate changes from the small area w2 to the small area w1 are considered as the movement amounts of the point p from the image 502 to the image 501. Such a measurement of the movement amounts is performed at all the points where three-dimensional position information is desired, and the results are recorded.

In ST304, the disparity is measured by use of a pair of the latest images taken by the two imaging devices 101. The method for the disparity measurement is same as the motion information measurement in ST303 except that two pairs of images taken by different imaging devices are used, and in the method, an area similar to the small area including the point p whose three-dimensional position information is desired is searched for in the other image. The difference in the coordinates between the area obtained by this search and the original area becomes a disparity. The disparity measurement may be performed in the manner of searching from the imaging device that has performed the motion information measurement to the other imaging device. The disparity measurement is performed at all the points where the three-dimensional position information is required, and the results are recorded.

In the case of a normal stereo image process without asynchronous taking, the shutter time points of two items of image data are same, and therefore, three-dimensional position information can be obtained appropriately from the results of the disparity measurement. However, in the case of two images having a time difference, a large error occurs with a moving object if three-dimensional position information is calculated in the same manner as in the conventional method. Accordingly, in ST305, a correction of the disparity information is performed by use of the motion information. The principle of the correction is as described below.

Figure 6:
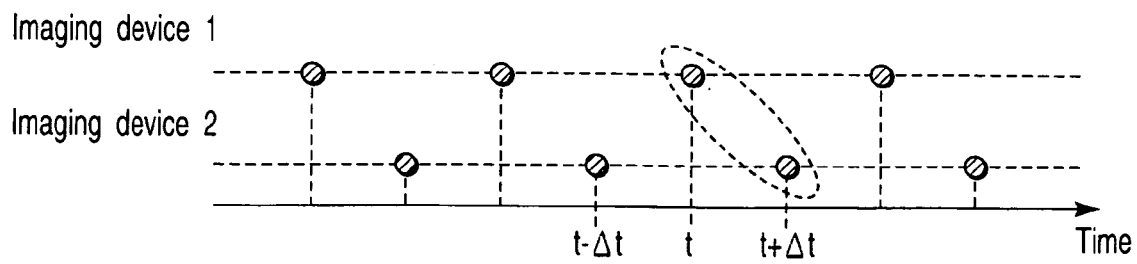
FIG. 6 is a view showing the shutter timing by two imaging devices, and showing the shutter timing of image data for use in a stereo view.
Figure 7:
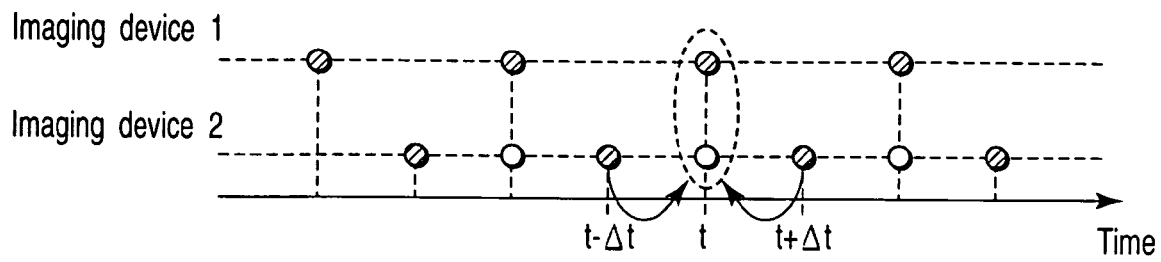
FIG. 7 is a view showing imputation of a virtual image at a time point t.

FIG. 6 is a view showing the shutter timing by the two imaging devices 1 and 2. Now, a case of performing the stereo image process of two images obtained at a time point t and a time point t+Δt circled by a dotted line is considered. As is seen from FIG. 6, there occurs a difference of switching time Δt of image signals between the shutter time points of the two images. If the object moves during this time period, the correct three-dimensional position information cannot be obtained. If the image data of the imaging device 2 at the time point t can be obtained even approximately, it can be processed by the normal stereo image process. For this purpose, as shown in FIG. 7, the image at the time point t is complemented by use of the images taken by the imaging device 2 at the time point t−Δt and the time point t+Δt. In the embodiment of the invention, the same effect as the above is obtained, for example, as follows.

Figure 8:
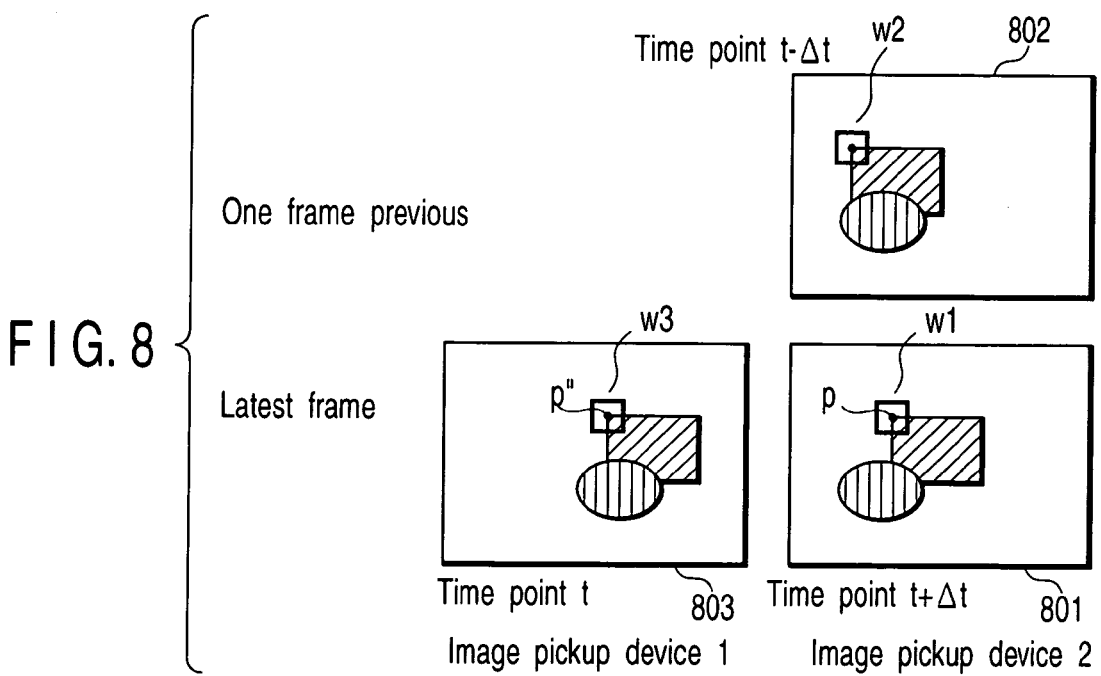
FIG. 8 is a view showing objective image frames of virtual synchronization in the embodiment.

In FIG. 8, image data 803 is obtained by the imaging device 1 at the time point t. Image data 801, 802 are taken by the imaging device 2 at the time points t+Δt and t−Δt, respectively. The shutter timing of these items of image data is same as that in FIG. 6. Now, with regard to the image data of the imaging device 2, corresponding points have been obtained from the one frame previous image data 802 by the motion detecting unit 105 at all the points in image data 801 where three-dimensional position information are desired, and the movement amounts during the time 2Δt have been obtained. Further, by the disparity measuring unit 106, corresponding points on the image data 803 have been obtained for all the points in the image data 801 where three-dimensional position information are desired. The disparities between the imaging devices have been also measured. As described above, at each point p in 801, the movement amount v from the time point t−Δt to t+Δt, and the disparity d with the image data of the imaging device 1 have been obtained. When a position p' of the point p at the time point t is forecasted from the movement amount v, it is considered that p'=p−v/2. Accordingly, when a corresponding point of the point p in the image data 803 of the imaging device 1 is defined as p'', a disparity d' between p' and p'' virtually synchronized at the time point t is obtained by an equation d'=d−v/2. The disparity d' is equivalent to the disparity concerning a pair of images obtained at a same time point. Therefore, after this, the three-dimensional position information can be obtained in the same manner as in the conventional stereo image processing method.

Figure 9:
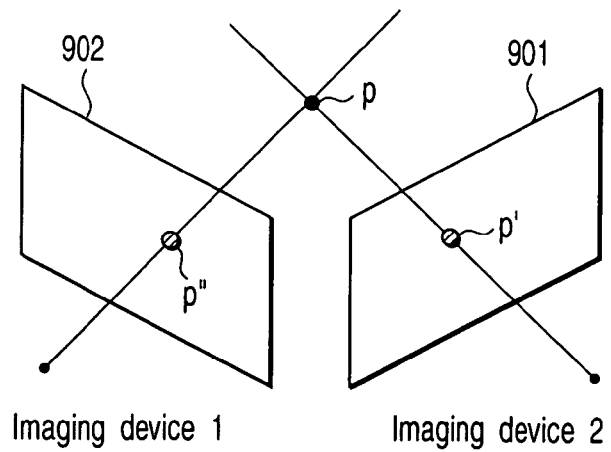
FIG. 9 is a view showing a pair of two-dimensional images and three-dimensional position information.

In ST306, the three-dimensional position information is calculated from the disparity information obtained by the virtual synchronization. The technique for obtaining corresponding points between images taken by different imaging devices 101, thereby obtaining the three-dimensional position information has been well known as described in a reference document ("three-dimensional Vision", written by Gang Xu and Saburo Tsuji, Chapter 7 Binocular Vision), the entire contents of which are incorporated herein by reference. In brief explanation, if the optical characteristics of imaging devices and the positional relation between the imaging devices are already known, the three-dimensional position P where there were the portions that these points represent originally can be obtained, as shown in FIG. 9, from the point p'' on the image 902 of the imaging device 1 and the point p' on the image 901 of the imaging device 2 obtained by virtual synchronization. By the virtual synchronization as the above, it becomes possible to perform the stereo image process to a pair of images having a time difference.

Finally, in ST307, the control unit of the robot 1 calculates the control amount on the basis of the obtained three-dimensional position information as follows. For example, the control unit determines the rotation amount of the wheels so as to keep constant the distance to an object to follow, operates joints so as to grip a matter to be an object, and so forth. Or, the control unit determines the rotation amount and the rotation speed of the movement driving control such as a servo motor such that the three-dimensional distance from the imaging device 101 to an object becomes closer to a target.

According to the first embodiment explained heretofore, even in the case where image signals output from plural imaging devices cannot be taken in and processed at a same time point, and as a result, there occur time differences between image data obtained from respective imaging devices, it is possible to acquire the three-dimensional position information of a moving object. The present invention having such an advantage is suitable for a hardware configuration whose image processing performance is inferior. Further, the technique for reducing three-dimensional position error can be performed with only three items of image data of each time point, so that, there is another advantage that there occurs no accumulation of errors.

Second Embodiment

Figure 10:
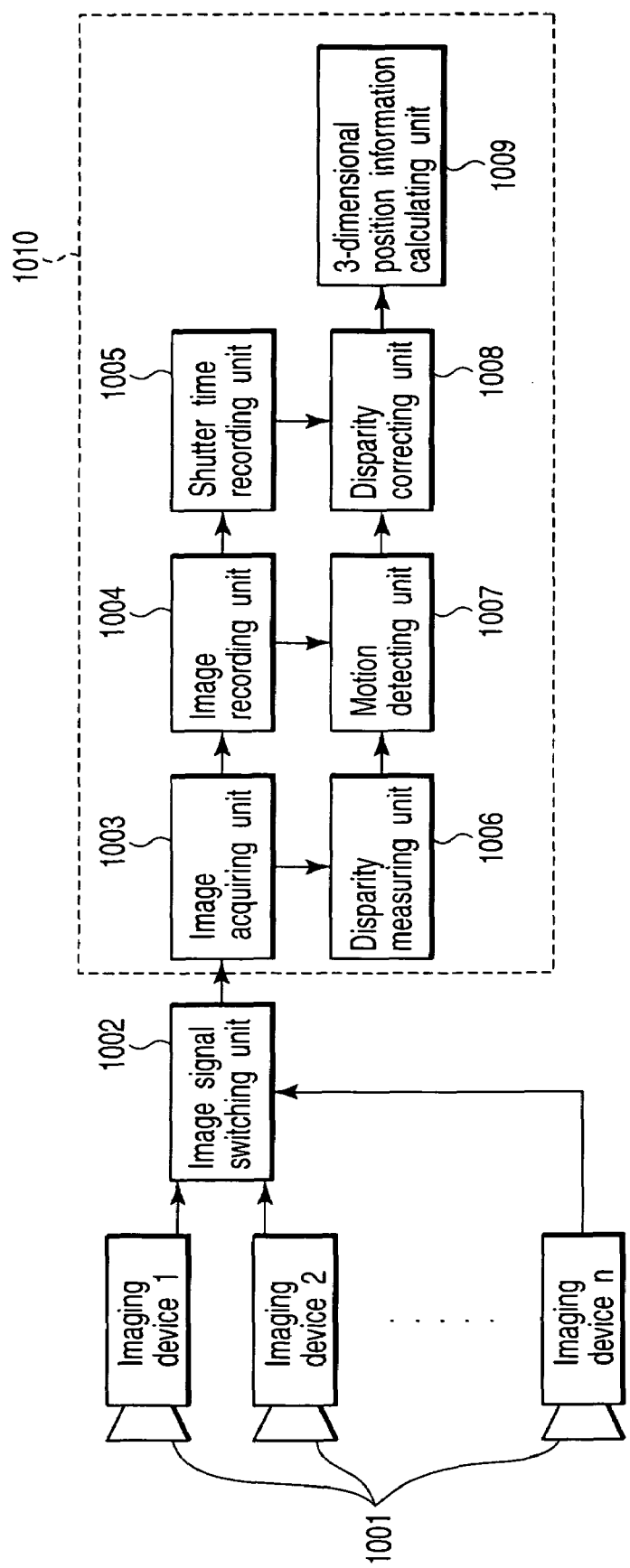
FIG. 10 is a block diagram showing an image processing apparatus according to a second embodiment of the present invention.

FIG. 10 is a block diagram showing an image processing apparatus according to a second embodiment of the present invention. The present embodiment is different from the first embodiment in that the number of imaging devices 1001 is not limited to two but generalized to n units, and that a shutter time recording unit 1005 for recording shutter time points is added thereto. Other structural elements are same as those in the first embodiment.

Figure 11:
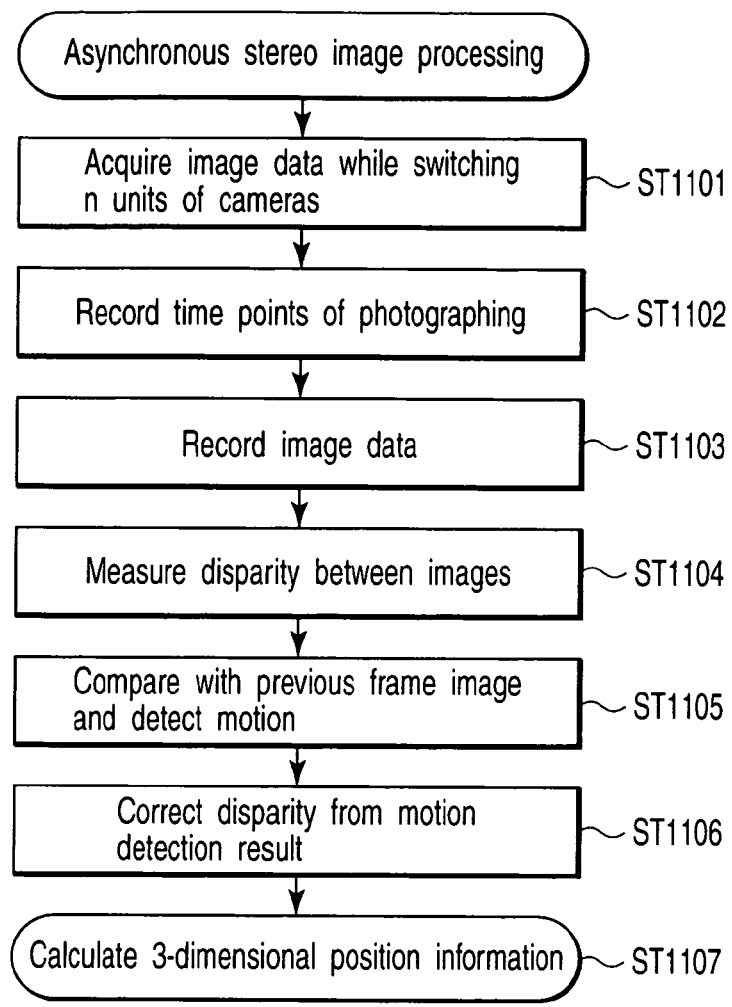
FIG. 11 is a flow chart showing an asynchronous stereo image processing procedure according to the second embodiment of the invention.

Next, operations of the embodiment are explained hereinafter. FIG. 11 is a flow chart showing an asynchronous stereo image processing procedure according to the second embodiment of the invention. Explanations on the portions of the same processes as those of the first embodiment are omitted herein, and in ST1101, taking is performed by switching image data by the image signal switching unit 102 in the order of imaging devices 1, 2, . . . , n. When the imaging device n is reached, the switching goes back to the imaging device 1 and taking in images is repeated.

In ST1102, time points of taking image data are recorded. The time point recording is performed for each imaging device, and at least the latest frame time point and the past one frame time point are recorded, respectively.

In the image data recording in ST1103, image data of at least the past one frame for each imaging device is recorded.

[Disparity Measurement]

In ST1104, disparities between images are measured. The disparity measurement method itself is same as that in the first embodiment. However, like the latest image data of the imaging device n and the latest image data of the imaging device 1, the imaging device n and the imaging device 2, . . . , the imaging device n and the imaging device n-1, the corresponding point search is performed to all other imaging devices for use in stereo vision, with regard to a certain imaging device (herein, the imaging device n). At this moment, it is possible to use only the part of n units. In this case, corresponding points are searched for with regard to all the imaging devices.

[Motion Detection]

In ST1105, motions of each imaging device are detected. With regard to the respective imaging devices for use in the stereo vision, comparison with the recorded one frame previous image is performed, and the movement amounts of all the points whose three-dimensional position information is to be obtained are measured. The concrete method is same as that in the first embodiment.

[Disparity Correction]

In ST1106, disparity information is corrected on the basis of the result of the disparity measurement and the result of the motion detection. In the case of "n" imaging devices, the shutter timing is as shown in FIG. 12.

Figure 12:
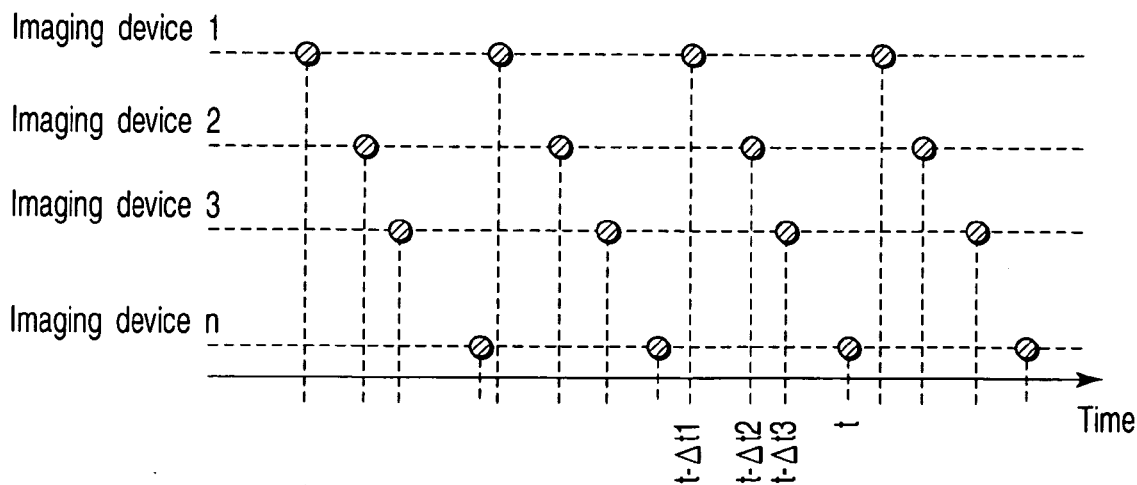
FIG. 12 is a view showing the shutter timing in the case of "n" imaging devices.

With regard to each imaging device, the shutter time points of the latest frame and the past one frame, and the movement amount for that time period have been obtained, so that it is possible to perform a virtual synchronization to an arbitrary time point from the time point $t-\Delta t1$ to the time point t shown in FIG. 12.

As the method of virtual synchronization, the positions of corresponding points at an arbitrary time point can be forecasted by means of linear interpolation of the movement amount. Meanwhile, in the explanation of the present embodiment, it has been made a precondition that only one of plural imaging devices can take in images at the same time. However, even in the case where images can be taken in from two or three imaging devices at the same time, but all the imaging devices are not always synchronized, it is possible to take synchronization virtually according to the present invention.

In ST1107, three-dimensional position information is calculated from corresponding point information of plural images. The method therefor is same as that in the first embodiment, but in the present embodiment, intersection points of all the straight lines that go through the corresponding points are made three-dimensional positions, thereby robustness is improved. However, since all the straight lines hardly intersect one point owing to influences of errors, the portion where all the straight lines get together most is made a resultant three-dimensional position.

According to the present embodiment explained heretofore, it is possible to reduce errors in the stereo image process using pairs of images taken by two or more imaging devices at mutually different frame time points, and to calculate the three-dimensional position information of an object. Namely, even in an apparatus configuration where simultaneous taking is not available, it is possible to carry out a measurement with a few errors. Further, such an apparatus can be configured at relatively low costs, and as a consequence, it is possible to realize the same precision with a low cost apparatus. Furthermore, it is possible to realize the process according to the present invention by use of the existing stereo image processing technology without greatly changing it.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
an image acquiring device to acquire a first image obtained by taking a moving object at a frame time point t by a first imaging device, a second image obtained by taking the moving object at a frame time point $t+\Delta t$ by a second imaging device having a view point different from that of the first imaging device, and a third image obtained by taking the moving object at a frame time point $t-\Delta t$ by the second imaging device;
a disparity measuring device configured to search for a first corresponding point on the first image corresponding to an arbitrary point on the second image, and to measure the disparity of the arbitrary point;
a motion information calculating device configured to calculate motion information of the arbitrary point on the basis of the third image;
a disparity correcting device configured to correct the disparity by use of the motion information as a correction amount; and
a three-dimensional position information calculating device configured to calculate three-dimensional position information of the arbitrary point on the basis of the corrected disparity.

2. An image processing apparatus according to claim 1, wherein the disparity measuring device searches for the first corresponding point by block matching.

3. An image processing apparatus according to claim 1, wherein the motion information calculating device searches for a second corresponding point on the third image corresponding to the arbitrary point, and calculates the movement amount on the image between the arbitrary point and the second corresponding point as the motion information.

4. An image processing apparatus according to claim 3, wherein the motion information calculating device searches for the second corresponding point by block matching.

5. An image processing method comprising:
acquiring a first image obtained by taking a moving object at a frame time point t by a first imaging device, a second image obtained by taking the moving object at a frame time point $t+\Delta t$ by a second imaging device having a view point different from that of the first imaging device, and a third image obtained by taking the moving object at a frame time point $t-\Delta t$ by the second imaging device;
searching for a first corresponding point on the first image corresponding to an arbitrary point on the second image, and measuring the disparity of the arbitrary point;
calculating motion information of the arbitrary point on the basis of the third image;
correcting the disparity by use of the motion information as a correction amount; and
calculating three-dimensional position information of the arbitrary point on the basis of the corrected disparity.

6. An image processing method according to claim 5, wherein the first corresponding point is searched for by block matching.

7. An image processing method according to claim 5, wherein a second corresponding point on the third image corresponding to the arbitrary point is searched for, and the movement amount on the image between the arbitrary point and the second corresponding point is calculated as the motion information.

8. An image processing method according to claim 7, wherein the second corresponding point is searched for by block matching.

9. A computer program stored in a computer readable medium, the program comprising:

means for instructing a computer to acquire a first image obtained by taking a moving object at a frame time point t by a first imaging device, a second image obtained by taking the moving object at a frame time point t+Δt by a second imaging device having a view point different from that of the first imaging device, and a third image obtained by taking the moving object at a frame time point t−Δt by the second imaging device;

means for instructing the computer to search for a first corresponding point on the first image corresponding to an arbitrary point on the second image, and measure the disparity of the arbitrary point;

means for instructing the computer to calculate motion information of the arbitrary point on the basis of the third image;

means for instructing the computer to correct the disparity by use of the motion information as a correction amount; and means for instructing the computer to calculate three-dimensional position information of the arbitrary point on the basis of the corrected disparity.

10. A computer program according to claim 9, wherein the first corresponding point is searched for by block matching.

11. A computer program according to claim 9, wherein a second corresponding point on the third image corresponding to the arbitrary point is searched for, and the movement amount on the image between the arbitrary point and the second corresponding point is calculated as the motion information.

12. A computer program according to claim 11, wherein the second corresponding point is searched for by block matching.

* * * * *